Nov. 17, 1959 B. O. AUSTIN 2,913,550

CIRCUIT INTERRUPTER

Filed Dec. 2, 1957 7 Sheets-Sheet 1

WITNESSES

Edwin E. Bassler

Leon M. Garman

INVENTOR

Bascum O. Austin

BY [signature]

ATTORNEY

Nov. 17, 1959 B. O. AUSTIN 2,913,550

CIRCUIT INTERRUPTER

Filed Dec. 2, 1957 7 Sheets-Sheet 2

Nov. 17, 1959 B. O. AUSTIN 2,913,550

CIRCUIT INTERRUPTER

Filed Dec. 2, 1957 7 Sheets-Sheet 3

Nov. 17, 1959 B. O. AUSTIN 2,913,550

CIRCUIT INTERRUPTER

Filed Dec. 2, 1957 7 Sheets-Sheet 4

Nov. 17, 1959 B. O. AUSTIN 2,913,550

CIRCUIT INTERRUPTER

Filed Dec. 2, 1957 7 Sheets-Sheet 5

Nov. 17, 1959 B. O. AUSTIN 2,913,550

CIRCUIT INTERRUPTER

Filed Dec. 2, 1957 7 Sheets-Sheet 6

Nov. 17, 1959 B. O. AUSTIN 2,913,550

CIRCUIT INTERRUPTER

Filed Dec. 2, 1957 7 Sheets-Sheet 7

United States Patent Office 2,913,550

Patented Nov. 17, 1959

2,913,550

CIRCUIT INTERRUPTER

Bascum O. Austin, Lima, Ohio, assignor to Westinghouse Electric Corporation, East Pittsburgh, Pa., a corporation of Pennsylvania Application December 2, 1957, Serial No. 700,236

12 Claims. (Cl. 200—98)

This invention relates, generally, to circuit interrupters and, more particularly to electromagnetically operated circuit interrupters.

The control apparatus in modern aircraft is required to operate at high ambient temperatures caused by air friction at high speeds and an object of the invention is to provide a circuit interrupter capable of withstanding high temperatures.

Another object of the invention is to provide a circuit interrupter which shall not be adversely affected by vibration.

A further object of the invention is to provide electrical apparatus capable of operating properly over a wide range of temperature.

Still another object of the invention is to provide an electromagnetic device having resiliently mounted armatures.

A still further object of the invention is to provide an electromagnetic device having a plurality of operating magnets.

Other objects of the invention will be explained fully hereinafter or will be apparent to those skilled in the art.

In accordance with one embodiment of the invention, a circuit breaker has a plurality of closing magnets which are disposed at opposite ends of a generally rectangular ceramic base having recesses therein for the contact members of the breaker. The armatures for the magnets are carried by a movable frame which is attached to the intermediate portion of a generally flat stabilizing spring, the ends of which are supported by bolts attached to the base. The contact members, which are spring opened, are held closed by plungers carried by the frame which is latched in the closed position by a spring-biased latch released by tripping magnets.

For a better understanding of the nature and objects of the invention, reference may be had to the following detailed description, taken in conjunction with the accompanying drawings, in which.

Figure 1:
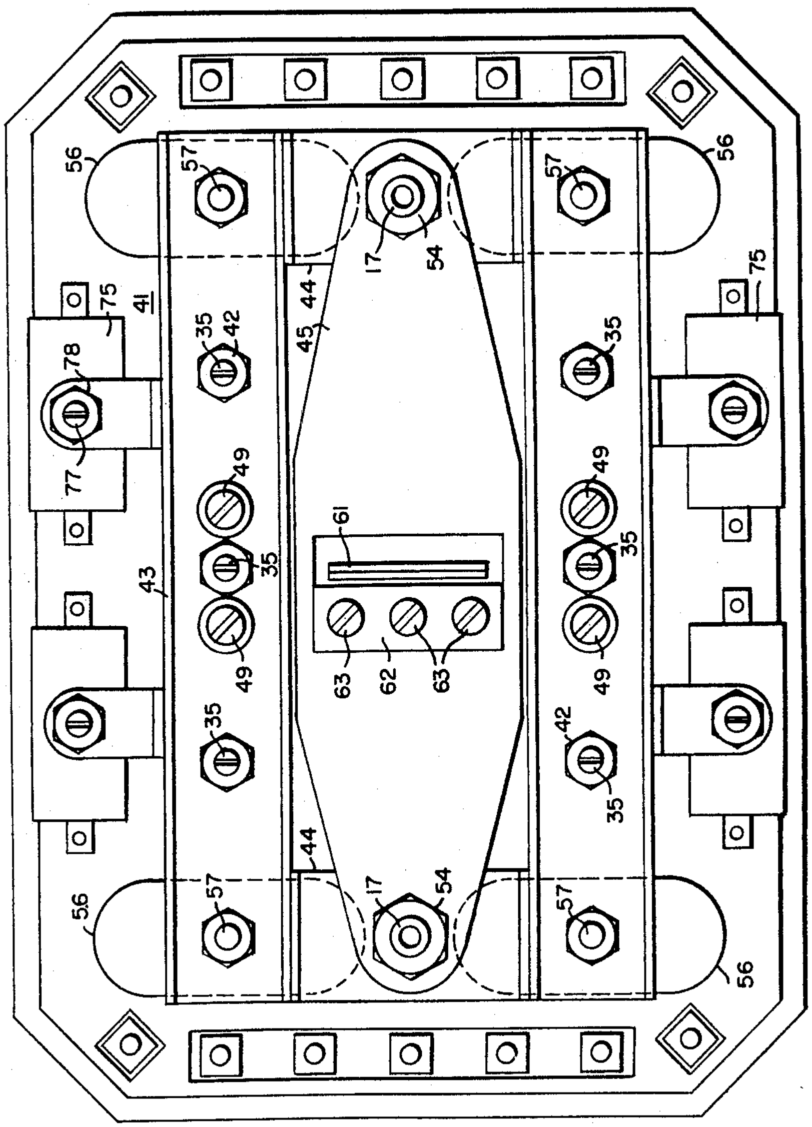
Figure 1 is a view, in plan, of a circuit breaker embodying the principal features of the invention, the cover being removed.
Figure 2:
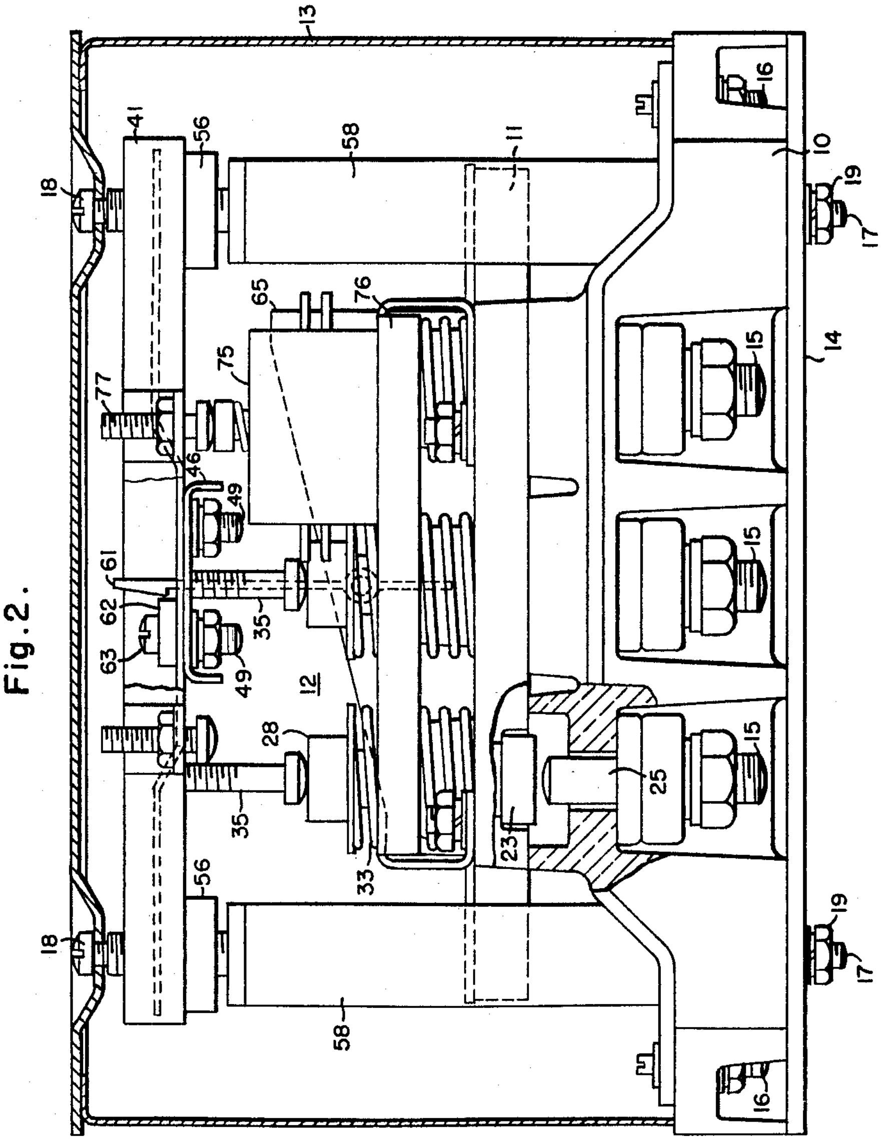
Fig. 2 is a view, partly in side elevation and partly in section, of the circuit breaker shown in Fig. 1.
Figure 3:
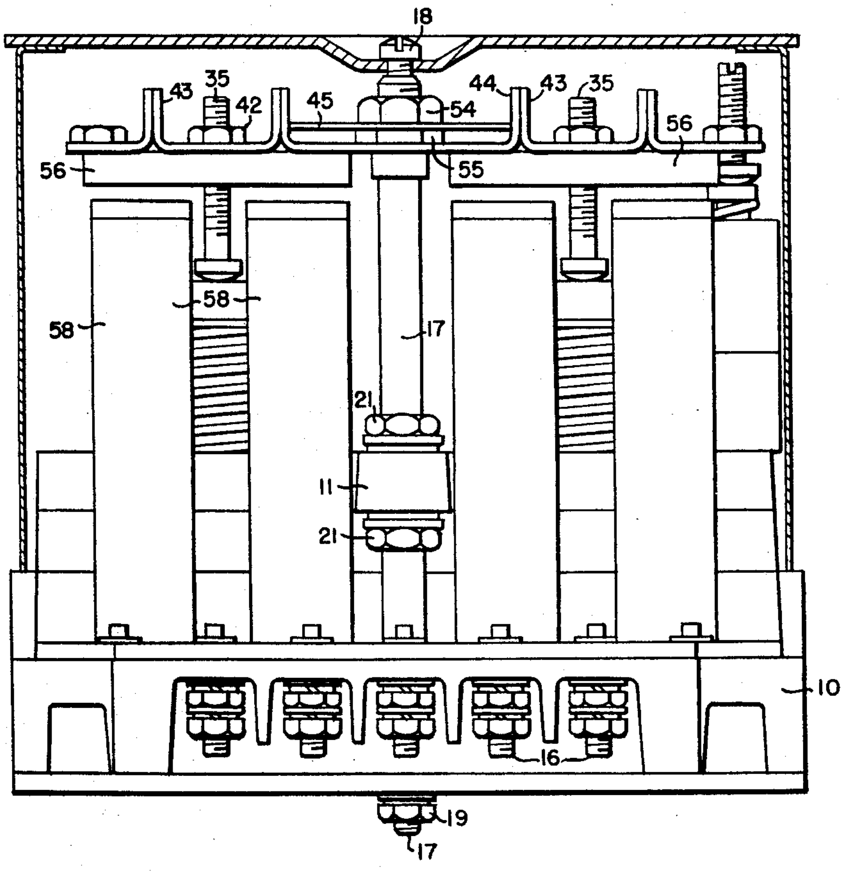
Fig. 3 is a view, partly in end elevation and partly in section, of the circuit breaker.

Referring to the drawings, and particularly to Figs. 1, 2 and 3, the structure shown therein comprises a main base 10 a secondary base 11, a three-pole circuit breaker 12 which is mounted on the base 10, a metal cover 13 for protecting the circuit breaker 12 and a bottom plate 14 for protecting main terminal members 15 of the circuit breaker 12, and control terminal members 16 to which the control wiring for the circuit breaker may be connected. The bases 10 and 11 are preferably composed of a ceramic or other insulating material capable of withstanding relatively high temperatures. The cover 13 is preferably composed of steel also capable of withstanding relatively high temperatures. Other metal parts of the structure are composed of steel or titanium or other metals or alloys which are not adversely affected by high temperatures.

The secondary base 11, the bottom plate 14 and the cover 13 are retained in position by two supporting studs 17 which extend through the bottom plate 14, the main base 10, the secondary base 11 and the cover 13. As shown in Figs. 2 and 3, tap screws 18 are inserted into the upper ends of studs 17 to retain the cover 13 in position and nuts 19 are threaded on to lower ends of the studs 17 to retain the bottom plate 14 in position. As shown in Fig. 3, nuts 21 are threaded on the studs 17 at opposite sides of the secondary base 11 to retain the secondary base in position on top of the main base 10.

Figure 4:
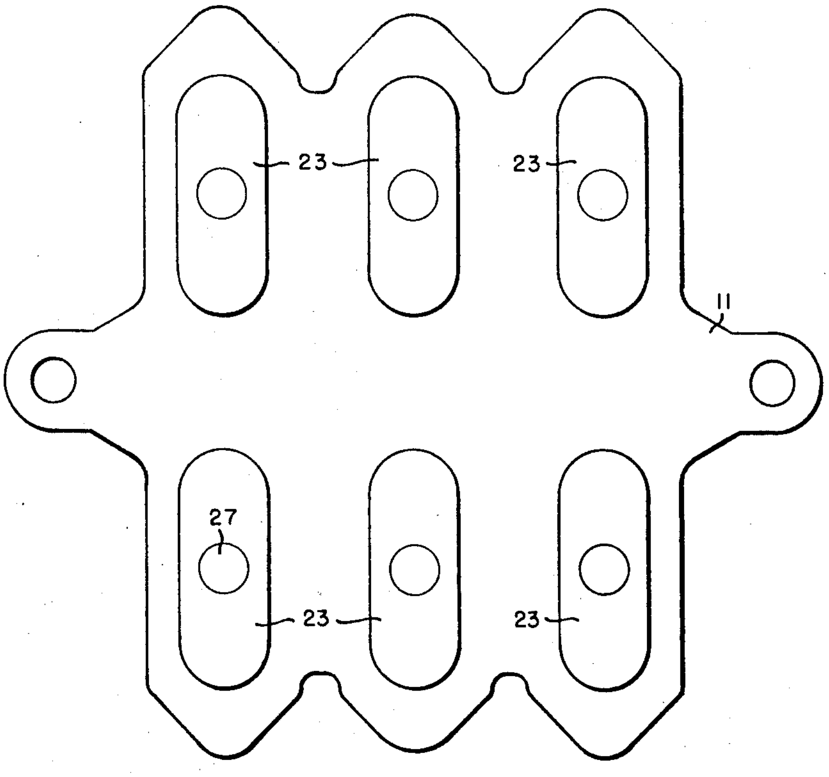
Fig. 4 is a view, in bottom plan, of the movable contact assembly for the circuit breaker.
Figure 5:
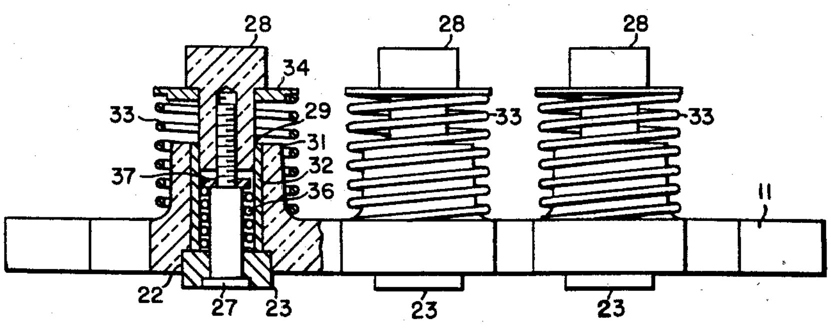
Fig. 5 is a view, partly in elevation and partly in section, of the contact assembly shown in Fig. 4.
Figure 6:
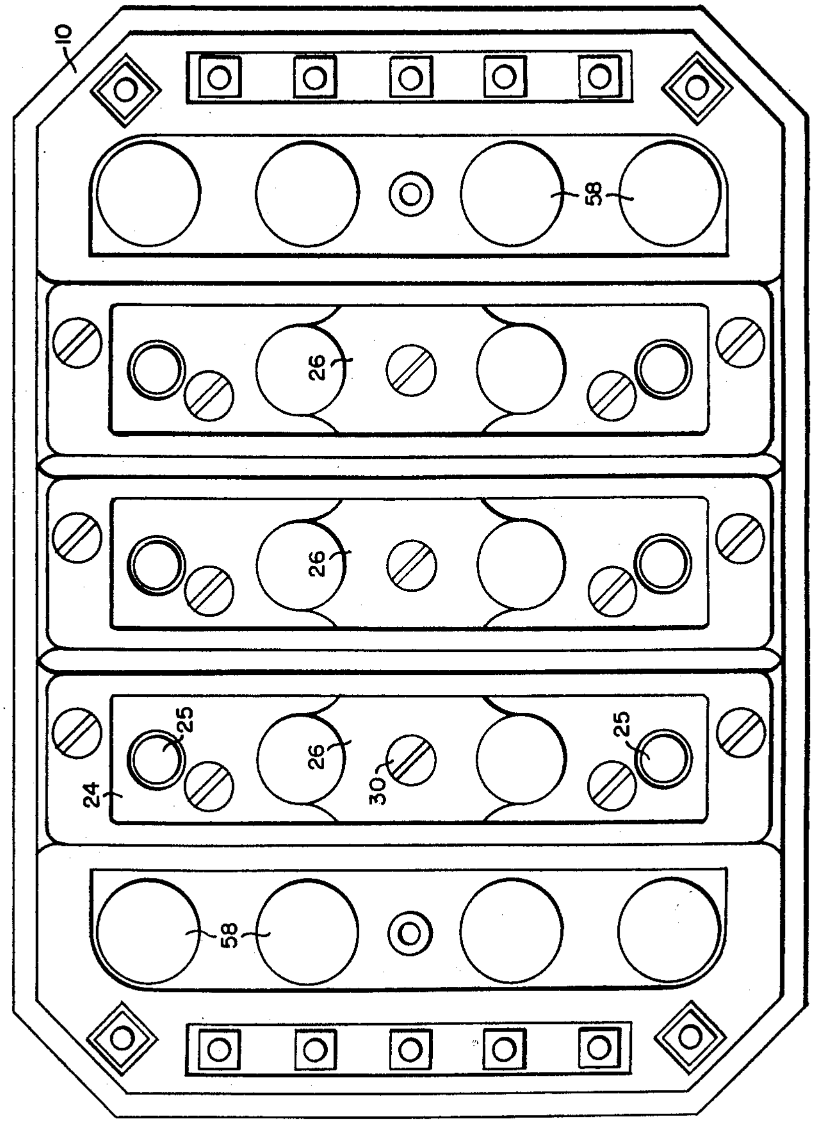
Fig. 6 is a view, in plan, of the base and fixed contact members.

As shown in Figs. 4 and 5, the secondary base 11 is provided with recesses 22 for containing movable contact members or bars 23 of the circuit breaker 12. Likewise, as shown in Fig. 6, the main base 10 is provided with recesses 24 for containing fixed contact members of the circuit breaker 12. Each pole of the circuit breaker has two spaced fixed contact members 25 and a contact bridge 26 which is disposed between the space contact members 25 and is spaced from the members 25. Each bridge 26 is retained in position by a bolt 30 which extends through the base 10. Each pole of the circuit breaker also has two of the spaced movable contact bars 23 which are so disposed that one bar 23 engages a fixed contact member 25 and one end of a bridge 26 when the movable contact members are depressed in a manner which will be more fully described hereinafter. Thus, when the movable contact members 23 are in engagement with the fixed contact members 25 and 26 for each pole of the circuit breaker, a circuit is established through each pole from a main terminal member 15 through a contact 25, a contact bar 23, a bridge 26, another contact bar 23 and another fixed contact 25 to the other main terminal 15 for that pole of the circuit breaker.

When the movable contact members are separated from the fixed contact members, the series circuit through the members is interrupted at four places, thereby aiding in the interruption of the arcs drawn between the contact members. Furthermore, since the contact members are enclosed in the recesses provided in the main base 10 and the secondary base 11, the pressure built up during the opening of the circuit aids in the interruption of the arcs.

As shown more clearly in Figs. 4 and 5, each contact bar 23 is movably disposed on a screw 27 which is inserted in a member 28, preferably composed of ceramic material. The member 28 is movably disposed in an opening 29 provided in a raised portion 31 on the secondary base 11. A bearing sleeve 32 is provided in the opening 29. A compression spring 33 surrounds the raised portion 31 between the body of the secondary base 11 and a washer 34 which engages a shoulder on the member 28. Thus, the contact bar 23 is normally biased upwardly by the spring 33. When the member 28 is depressed by a plunger 35, in a manner more fully described hereinafter, the contact bar 23 is pressed into engagement with fixed contact members 25 and 26. A compression spring 36, which surrounds the screw 27 between the contact bar 23 and a washer 37, is compressed as the screw 27 moves through the bar 23. Thus, the contact pressure between the bar 23 and the fixed contact members 25 and 26 is determined by the compression of the spring 36.

As shown most clearly in Figs. 1, 2 and 3, the plungers 35 are adjustably mounted in a generally rectangular frame 41. The upper end of each plunger is slotted and a nut 42 is provided on a threaded portion of each plunger to permit the position of the plunger in the frame 41 to be adjusted. The frame 41 comprises two spaced channel-shaped side members 43 and two channel-shaped end members 44 which may be welded together or secured together in any other satisfactory manner. As shown in Figs. 1 and 3, three plungers 35 are mounted in each one of the side members 43 of the frame 41.

Figure 7:
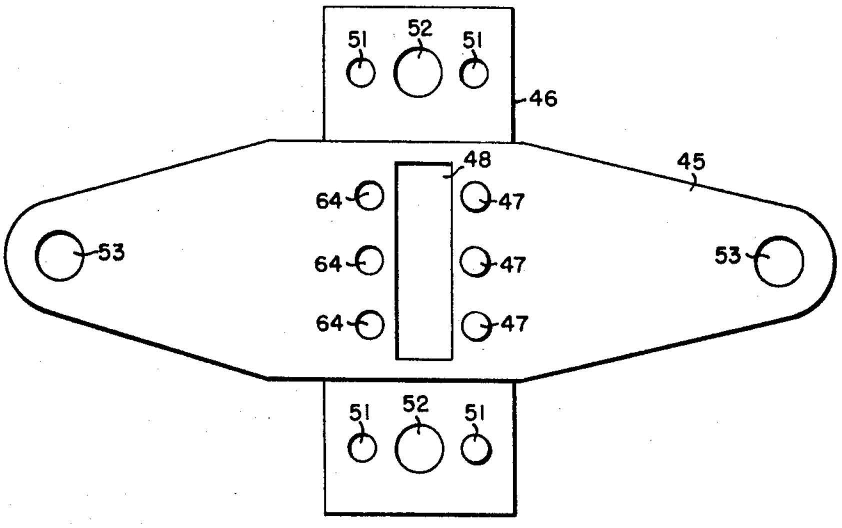
Fig. 7 is a view, in plan, of the stabilizing spring utilized in the circuit breaker.
Figure 8:
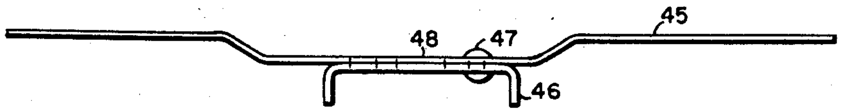
Fig. 8 is a view, in side elevation, of the spring shown in Fig. 6.

In order to prevent the operation of the circuit breaker from being adversely affected by vibration, the frame 41 is resiliently supported by a stabilizing spring 45. As shown most clearly in Figs. 7 and 8, the spring 45 is of a leaf type and is generally flat with the middle portion being slightly depressed. The spring 45 is attached to a channel-shaped transverse member 46 by rivets 47. A rectangular opening 48 is provided in the spring 45 and the transverse member 46. The member 46 is attached to the side members 43 of the frame 41 by screws 49 which extend through openings 51 in the member 46. Two of the plungers 35 extend through openings 52 provided in the transverse member 46. The ends of the leaf spring 45 are supported by the bolts 17 which pass through openings 53 in the spring 45. As shown most clearly in Fig. 3, lock nuts 54 and 55 are provided on each bolt 17 at opposite sides of the spring 45 for attaching the spring to the bolt 17. The position of the ends of the spring 45 may be raised or lowered by adjusting the lock nuts 54 and 55. In this manner, the frame 41 is resiliently supported by the spring 45.

As shown in Figs. 1, 2 and 3, an armature member 56 is attached at each corner of the rectangular frame 41 by a bolt 57. As shown in Figs. 2 and 3, two electromagnetic members 58 are provided for each armature member 56. Each electromagnetic member 58 comprises a core, which is attached to the main base 10, and preferably, only a single turn of wire wound on the core. The wire is preferably composed of an alloy having a higher resistance than copper and a lower temperature coefficient of resistance. The alloy should be one capable of withstanding relatively high temperatures.

In order to utilize such a wire, a plurality of armature members and electromagnetic members for actuating the armature members are provided instead of utilizing only one large electromagnetic member and one armature. Thus, by utilizing several electromagnetic members in parallel, the main length of wire on each core member is reduced, thereby permitting a high resistance wire to be utilized. Furthermore, only a single layer of wire is required on each core, thereby simplifying the problem of insulating the winding. The air gap or distance between each armature 56 and its core members 58 may be adjusted by adjusting the position of the leaf spring 45 on the supporting bolts 17 in the manner previously described.

When the windings on the cores are energized by a suitable electric source, the armatures 56 are attracted to the cores, thereby lowering the plungers 35 carried by the frame 41 to close the contact members of the circuit breaker. The frame 41 is retained in its lowered position by means of a spring-biased latch 61 which engages a latch bar 62 attached to the spring 45 by screws 63 which are inserted in openings 64 provided in the spring 45 and the transverse member 46. The latch 61 extends through the opening 48.

Figure 9:
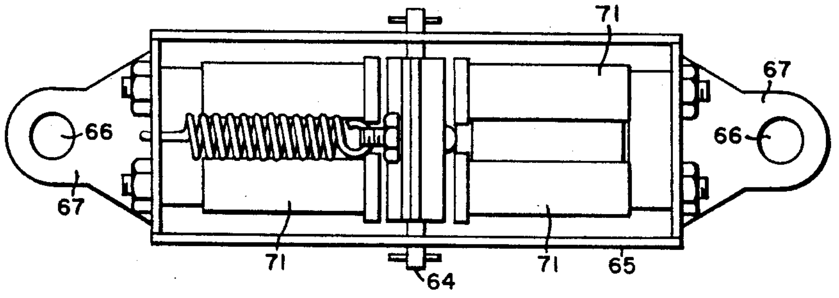
Fig. 9 is a view, in plan, of the latching mechanism utilized in the circuit breaker.
Figure 10:
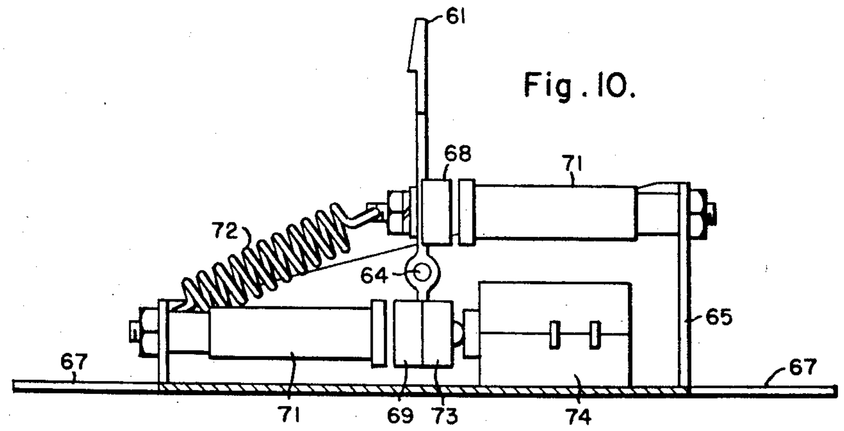
Fig. 10 is a view, partly in side elevation and partly in section, of the latching mechanism.
Figure 11:
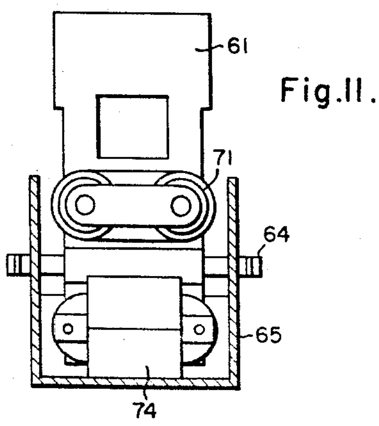
Fig. 11 is a view, partly in end elevation and partly in section, of the latching mechanism.

As shown most clearly in Figs. 9, 10 and 11, the latch 61 is pivotally mounted on a pin 64 which extends through the sides of a generally U-shaped member 65. The member 65 rests on the secondary base 11 and is retained in position by the bolts 17 which extend through openings 66 provided in ears 67 on the base of the U-shaped member 65.

An armature member 68 is attached to the latch 61 above the pivot pin 64. Another armature member 69 is attached to the latch 61 below the pin 64 on the opposite side of the member 61 from the armature 68. Two electromagnetic members 71 are provided for each armature member 68. The members 71 may be similar in construction to the members 58 except of a smaller size. The members 71 are attached to the supporting member 65. A spring 72 biases the latch 61 into engagement with the latch bar 62.

When the electromagnetic members 71 are energized the armatures 68 and 69 are attracted in opposite directions, thereby cooperating in overcoming the tension of the spring 72 since the armatures are located on opposite sides of the pivot pin 64. Thus, the latching mechanism may be released to trip or open the circuit breaker 12. The operation of the tripping mechanism may be controlled by suitable relays or it may be manually controlled if desired.

A counterweight 73 is attached to the lower end of the latch 61 opposite the armature 69. An interlocking or auxiliary switch mechanism 74 may be actuated by the counterweight 73, thereby providing interlocking contacts which may be utilized in connection with the operation of the circuit breaker.

As shown in Figs. 1 and 2, additional interlocking devices 75 may be mounted on support members 76 which are attached to the secondary base 11. The interlocking devices 75 are actuated by plungers 77 adjustably attached to angle members 78 which, in turn, are attached to the side members 43 of the frame 41. Thus, when the frame 41 is lowered to close the main contact members of the circuit breaker, the interlocking devices are actuated by the plungers 77. The contact members of the interlocking devices may be utilized in the control system of which the circuit breaker is a part.

From the foregoing description, it is apparent that the present invention provides a circuit breaker which is particularly suitable for operation at high temperatures. The circuit breaker is not adversely affected by vibration and it is relatively small and compact in structure, thereby making it suitable for use in aircraft. It has a relatively high interrupting capacity.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a circuit interrupter, in combination, a first insulating base having recesses therein, fixed contact members disposed in said recesses, movable contact members for engaging the fixed contact members, a second insulating base having recesses therein for the movable contact members, said bases being joined to enclose said contact members, a plurality of armature members for actuating the movable contact members, spring means for supporting the armature members, and a plurality of electromagnetic members for actuating said armature members.

2. A circuit interrupter comprising, a plurality of fixed contact members, a plurality of movable contact members for engaging the fixed contact members, spaced armature members for actuating the movable contact members, an elongated frame carrying the armature members at opposite ends of the frame, spring means for supporting the frame between its ends, a plurality of electromagnetic members for actuating the armature members, and adjustable members on the frame engaging the movable contact members.

3. A circuit interrupter comprising, a plurality of fixed contact members, a plurality of movable contact members for engaging the fixed contact members, spaced armature members for actuating the movable contact members, a generally rectangular movable frame carrying said armature members at opposite ends of the frame, spring means supporting said frame between its ends, and a plurality of electromagnetic members for actuating each one of the armature members.

4. In a circuit interrupter, in combination, an insulating base having recesses therein, fixed contact members disposed in said recesses, movable contact members for engaging the fixed contact members, a plurality of armature members for actuating the movable contact members, a generally rectangular movable frame carrying said armature members at opposite ends of the frame, spring means mounted on said base for supporting said frame between its ends, and a plurality of electromagnetic members for actuating each one of the armature members.

5. In a circuit interrupter, in combination, a main insulating base having recesses therein, fixed contact members disposed in said recesses, movable contact members for engaging the fixed contact members, a secondary insulating base having recesses therein for the movable contact members, the recesses in said bases forming an enclosure for the contact members, a plurality of armature members for actuating the movable contact members, a movable frame carrying said armature members, a spring of the leaf type attached to said frame, the ends of said spring being supported by said main base, and a plurality of electromagnetic members mounted on said main base for actuating each one of the armature members.

6. In a circuit interrupter, in combination, a main insulating base having recesses therein, fixed contact members disposed in said recesses, movable contact members for engaging the fixed contact members, a secondary insulating base having recesses therein for the movable contact members, the recesses in said bases forming an enclosure for the contact members, a plurality of armature members for actuating the movable contact members, a generally rectangular movable frame carrying said armature members, an elongated generally flat spring attached to said frame at substantially the mid points of the frame and the spring, means for adjustably attaching the ends of said spring to one of the bases to resiliently support the frame, and electromagnetic means for actuating the armature members.

7. In a circuit interrupter, in combination, a main insulating base having recesses therein, fixed contact members disposed in said recesses, movable contact members for engaging the fixed contact members, a secondary insulating base having recesses therein for the movable contact members, the recesses in said bases forming an enclosure for the contact members, a plurality of armature members for actuating the movable contact members, a generally rectangular movable frame carrying said armature members, an elongated generally flat spring attached to said frame at substantially the mid points of the frame and the spring, means for adjustably attaching the ends of said spring to one of the bases to resiliently support the frame, electromagnetic means for actuating the armature members, and adjustable means carried by the frame for engaging the movable contact members.

8. In a circuit interrupter, in combination, an insulating base having recesses therein, fixed contact members disposed in said recesses, movable contact members for engaging the fixed contact members, a plurality of armature members for actuating the movable contact members, a generally rectangular movable frame carrying said armature members, an elongated generally flat spring attached to said frame at substantially the mid points of the frame and the spring, means for adjustably attaching the ends of said spring to the base to resiliently support the frame, electromagnetic means for actuating the armature members, adjustable means on the frame for engaging the movable contact members to close the contact members, and an electromagnetically releasable latch for engaging the frame to retain the contact members closed.

9. In a multiple circuit breaker, in combination, a main base composed of insulating material having a recess therein for each pole, three spaced fixed contact members in each one of said recesses, a secondary base composed of insulating material having recesses therein aligned with the recesses in the main base when the secondary base is mounted on the main base, two movable contact members in each recess in the secondary base for engaging the fixed contact members in the corresponding recess in the main base, springs disposed on the secondary base for biasing the movable contact members away from the fixed contact members, a movable frame carrying plungers for actuating the movable contact members into engagement with the fixed contact members, spring means for supporting said frame, a plurality of armature members attached to the frame, and a plurality of electromagnetic members for actuating said armature members.

10. In a multipole circuit breaker, in combination, a main base composed of insulating material having a recess therein for each pole, three spaced fixed contact members in each one of said recesses, a secondary base composed of insulating material having recesses therein aligned with the recesses in the main base when the secondary base is mounted on the main base, two movable contact members in each recess in the secondary base for engaging the fixed contact members in the corresponding recess in the main base, springs disposed on the secondary base for biasing the movable contact members away from the fixed contact members, a generally rectangular frame having means movable therewith for actuating the movable contact members into engagement with the fixed contact members, a generally flat elongated spring for supporting said frame, the ends of said spring being attached to said base, and electromagnetic means at opposite ends of the frame for actuating the frame to close said contact members.

11. In a multiple circuit breaker, in combination, a main base composed of insulating material having a recess therein for each pole, three spaced fixed contact members in each one of said recesses, a secondary base composed of insulating material having recesses therein aligned with the recesses in the main base when the secondary base is mounted on the main base, two movable contact members in each recess in the secondary base for engaging the fixed contact members in the corresponding recess in the main base, springs disposed on the secondary base for biasing the movable contact members away from the fixed contact members, a generally rectangular frame having means movable therewith for actuating the movable contact members into engagement with the fixed contact members, a generally flat elongated spring for supporting said frame, the ends of said spring being attached to said base, electromagnetic means at opposite ends of the frame for actuating the frame to close said contact members, and a spring-engaged electromagnetically releasable latch for engaging said frame to retain the contact members closed.

12. In a multiple circuit breaker, in combination, a main base composed of insulating material having a recess therein for each pole, three spaced fixed contact members in each one of said recesses, a secondary base composed of insulating material having recesses therein aligned with the recesses in the main base when the secondary base is mounted on the main base, two movable contact members in each recess in the secondary base for engaging the fixed contact members in the corresponding recess in the main base, springs disposed on the secondary base for biasing the movable contact members away from the fixed contact members, a generally rectangular frame having means movable therewith for actuating the movable contact members into engagement with the fixed contact members, a generally flat elongated spring for supporting said frame, the ends of said spring being attached to said base, electromagnetic means at opposite ends of the frame for actuating the frame to close said contact members, a spring-engaged electromagnetically releasable latch for engaging said frame to retain the contact members closed, a pivoted latch, a spring for biasing the latch into engagement with the frame to retain the contact members closed, and electromagnetic means at opposite sides of the pivot point for releasing said latch.

References Cited in the file of this patent

UNITED STATES PATENTS

| | | |
|---|---|---|
| 560,471 | Chapman | May 19, 1896 |
| 1,770,090 | Slisz | July 8, 1930 |
| 2,036,295 | Piffath | Apr. 7, 1936 |
| 2,612,544 | Fisher | Sept. 30, 1952 |